United States Patent [19]
Schulz

[11] Patent Number: 5,448,079
[45] Date of Patent: Sep. 5, 1995

[54] REFLECTIVE PATTERN WITH CODED BEGINNING AND END FORMED ON THE SURFACE OF A SHEET HANDLING CYLINDER FOR DETECTING THE PRESENCE AND POSITION OF THE SHEET

[75] Inventor: Andreas Schulz, Heidelberg, Germany

[73] Assignee: Heidelberger Druckmaschinen AG, Heidelberg, Germany

[21] Appl. No.: 174,386

[22] Filed: Dec. 28, 1993

[30] Foreign Application Priority Data

Dec. 28, 1992 [DE] Germany .............. 42 44 276.1

[51] Int. Cl.⁶ .................................. G01N 21/86
[52] U.S. Cl. ............................. 250/559.29; 250/548
[58] Field of Search .............. 250/561, 548, 208.2, 250/214 R, , 555, 566; 271/258, 277

[56] References Cited

U.S. PATENT DOCUMENTS

| | | | |
|---|---|---|---|
| 3,948,170 | 4/1976 | Ericsson | 101/124 |
| 4,248,528 | 2/1981 | Sahay | 355/14 R |
| 4,292,529 | 9/1981 | Thurston | 250/561 |
| 4,314,159 | 2/1982 | Davis | 250/561 |
| 4,641,070 | 2/1987 | Pfizenmaier et al. | 318/640 |
| 5,119,213 | 6/1992 | Graves et al. | 358/488 |
| 5,124,760 | 6/1992 | Knapp et al. | 355/317 |
| 5,262,637 | 11/1993 | Cumberledge et al. | 250/223 R |

FOREIGN PATENT DOCUMENTS

| | | |
|---|---|---|
| 7700430 | 5/1978 | Germany . |
| 2322194 | 10/1982 | Germany . |
| 3836310 | 4/1990 | Germany . |
| 1-306247 | 2/1990 | Japan . |
| 2225556 | 4/1992 | United Kingdom . |

*Primary Examiner*—Edward P. Westin
*Assistant Examiner*—Steven L. Nichols
*Attorney, Agent, or Firm*—Herbert L. Lerner; Laurence A. Greenberg

[57] ABSTRACT

Device for measuring a position of a sheet edge on an outer cylindrical surface of a rotating cylinder, having at least one photoelectric scanner operating in accordance with the reflection principle, the photoelectric scanner being fixed to a location outside the cylinder and being connected to a control device for positioning a sheet, as well as being directed towards a sheet edge lying along a line formed on an outer cylindrical surface of the cylinder, and towards a label permanently formed in the outer cylindrical surface of the cylinder, the photoelectric scanner including a plurality of photoelectric receiver elements, and the label including a plurality of scanning tracks extending in a direction of movement of the sheet edge, each of the scanning tracks being associated with a respective one of the plurality of photoelectric receiver elements inside the photoelectric scanner, the label being covered by the sheet in a given measurement region.

4 Claims, 5 Drawing Sheets

REFLECTIVE PATTERN WITH CODED BEGINNING AND END FORMED ON THE SURFACE OF A SHEET HANDLING CYLINDER FOR DETECTING THE PRESENCE AND POSITION OF THE SHEET

BACKGROUND OF THE INVENTION

Field of the Invention

The invention relates to a device for measuring the location of a leading or trailing edge of a sheet retained on the surface of a cylinder for the purpose of pure measurement, or for determining an actual value within a position-control or regulating system. The invention may be employed in printing machines or other sheet-handling machines, wherein a sheet is transported by means of at least one cylinder.

In rotary printing machines, the precise location and positional stability of the sheet on the surface of a cylinder is decisive for high print quality. The position and locational stability, respectively, of a sheet on a cylinder are dependent upon various factors. A decisive factor is which position the sheet is in when it is taken over by the sheet-holding elements of the cylinder. To that end, in printing machines, front and side lays are provided as stops which are adjustable in order to correct the position of the sheet on the cylinder. Adjustment of the stops can be effected by means of a control device to which measurement signals can be fed regarding the position of the sheet on the cylinder.

After the take-over by the sheet-holding elements, the position of the sheet on the cylinder can be varied even further, due to the processing operation to which the sheet is subjected. For example, when a sheet is imprinted, after the printing nip, sheet lagging occurs oil the blanket cylinder, depending upon the printed image. The tear-off forces which then ensue are propagated as far as the gripper lock, so that gripper slip occurs, which causes an undesired and unintended change in the position of the sheet. As viewed over the width of the sheet, the gripper slip is not constant, so that in order to ascertain the position of the edge of the sheet, it may be necessary to make measurements at several locations. A plurality of measuring locations are also suitable for ascertaining skewing of the sheet and damage to the edge of the sheet.

A measurement device for determining the location of an edge of a sheet on the surface of a cylinder, which is accommodated in its entirety on the cylinder and revolves therewith, has become known heretofore from the German Utility Model DE-GM 77 00 430, for example.

A disadvantage of such a measurement device is that, for continuous display and evaluation of the measurement findings, the measurement signals must be carried onward from the rotating cylinder via rotary lead-throughs or other suitable devices. This requires an additional expenditure of material and finances and a resultant reduction in reliability.

Measuring devices have also become known heretofore which have a photoelectric scanner fixed to a frame and connected to a control device for positioning a sheet at a given location. As a rule, the photoelectric scanner includes a light transmitter and a photoelectric receiver. The light is projected onto the surface of the cylinder and is reflected more-or-less from the sheet, the cylinder surface and regions of the cylinder gap and, by means of an electric circuit arrangement, the position or location of the edge of the sheet in relation to the position or location of a fixed edge, such as a boundary of the cylinder gap, can be determined from the reflected light. For dimensional detection or ascertainment of the position or location of the edge of the sheet, the time that elapses between the appearance of the sides of the signal generated by the fixed edge of the cylinder and those of the signal generated by the edge of the sheet is determined.

A further method wherein the angle through which the cylinder turns between the appearance of these signal edges is disclosed in the published German Patent Document DE 23 22 194 C2 and the published Japanese Patent Document JP 1-306247 (A).

The method of time-measurement is disadvantageous in that measurement errors arise when fluctuations in the angular velocity of the cylinder occur within one revolution. The second method has the disadvantage that the resolution of the incremental angle encoders used for angle measurement is too low and, if the angle encoders which are coupled with the rotation of the cylinder have high resolution, the signal processing speed in the evaluation of the angle encoder signal is limited, respectively, so that the maximum possible rotary speed of the cylinder may be reduced.

To control the measuring operation, it has become known heretofore from the published German Patent Document DE 38 36 310 A1 to use the signal of a digital angle measuring system which is coupled with the rotation of the cylinder. At given angular positions, predetermined switching events are derived, which are controlled by the signal processing electronics for the position measuring signals generated by a scanner. To that end, the signals of the angle measuring system must be prepared or made-ready by circuitry means or by computer means with the aid of a program, which involves additional effort and expense and limits the maximum measurement speed.

SUMMARY OF THE INVENTION

It is accordingly an object of the invention to provide a device for measuring the position of an edge of a sheet on the surface of a rotating cylinder which permits an accurate measurement at a high rotary speed of the cylinder.

With the foregoing and other objects in view, there is provided, in accordance with the invention, a device for measuring a position of a sheet edge on an outer cylindrical surface of a rotating cylinder, having at least one photo-electric scanner operating in accordance with the reflection principle, the photoelectric scanner being fixed to a location outside the cylinder and being connected to a control device for positioning a sheet, as well as being directed towards a sheet edge lying along a line formed on an outer cylindrical surface of the cylinder, and towards a label permanently formed in the outer cylindrical surface of the cylinder, the photoelectric scanner comprising a plurality of photoelectric receiver elements, and the label comprising a plurality of scanning tracks extending in a direction of movement of the sheet edge, each of the scanning tracks being associated with a respective one of the plurality of photoelectric receiver elements inside the photoelectric scanner, the label being covered by the sheet in a given measurement region.

Thus, the label is permanently formed on the cylinder and, just like the edge of the sheet, is detected by a photoelectric scanner operating with the reflection principle, the label including a plurality of scanning tracks extending in the direction of movement of the edge of the sheet. Each scanning track is assigned to one photoelectric receiver element within the scanner. The label is disposed so that, in the measuring range, it is covered by the sheet whenever the sheet is properly held by retaining elements on the surface of the cylinder. A multiplicity of the scanner and the configuration of labels associated therewith may be provided over the width of the sheet. Because scanning is performed within a plurality of scanning tracks by means of a plurality of photoelectric receiver elements, redundance and multiple evaluation of the measurement signal are possible.

In accordance with another feature of the invention, each of the scanning tracks includes a leading and a trailing control mark, respectively, having different degrees of reflectivity, the line formed on the outer cylindrical surface of the cylinder being located between the leading and the trailing control marks, and each of the scanning tracks, respectively, having a uniform degree of reflectivity in the given measurement region wherein the label is covered by the sheet.

In accordance with a further feature of the invention, mutually adjacent scanning tracks in the given measuring region have different degrees of reflectivity.

In accordance with an added feature of the invention, reference labels are included in the leading control mark of at least one of the scanning tracks.

In accordance with a concomitant feature of the invention, the measurement device includes a logic circuit having outputs, the photoelectric receiver elements being connected to the logic circuit, and a counter circuit having a start/stop input connected to the outputs of the logic circuit.

Thus, in a particular formation of the labels, the measurement region per se is preceded and followed by control marks with a varying degree of reflection or reflectivity, and the degree of reflectivity remains constant or uniform within each track in the measurement region. The control marks may be used for initializing and resetting the measuring operation. In addition, the control marks may have a defined length within one measuring track, so that they are especially suitable as reference marks, the fluctuations in speed which arise within one revolution having only slight effects on the outcome of the measurement. The bit pattern present when a plurality of tracks are provided at the photoelectric receivers can be evaluated with the aid of a logic circuit in order to control the measuring operation, the signal edges or slopes originating from a particular bit pattern being utilizable for starting and stopping, respectively, the measuring operation for a reference path, and for the measurement path which extends up to the edge of the sheet. The travel measurement can be converted into a time measurement if these signal edges or slopes act upon the start/stop input of a counter having a pulse input to which a constant high-frequency signal pulse train is applied.

Other features which are considered as characteristic for the invention are set forth in the appended claims.

Although the invention is illustrated and described herein as embodied in a device for measuring the position of an edge of a sheet on a surface of a rotating cylinder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENT

Figure 1:
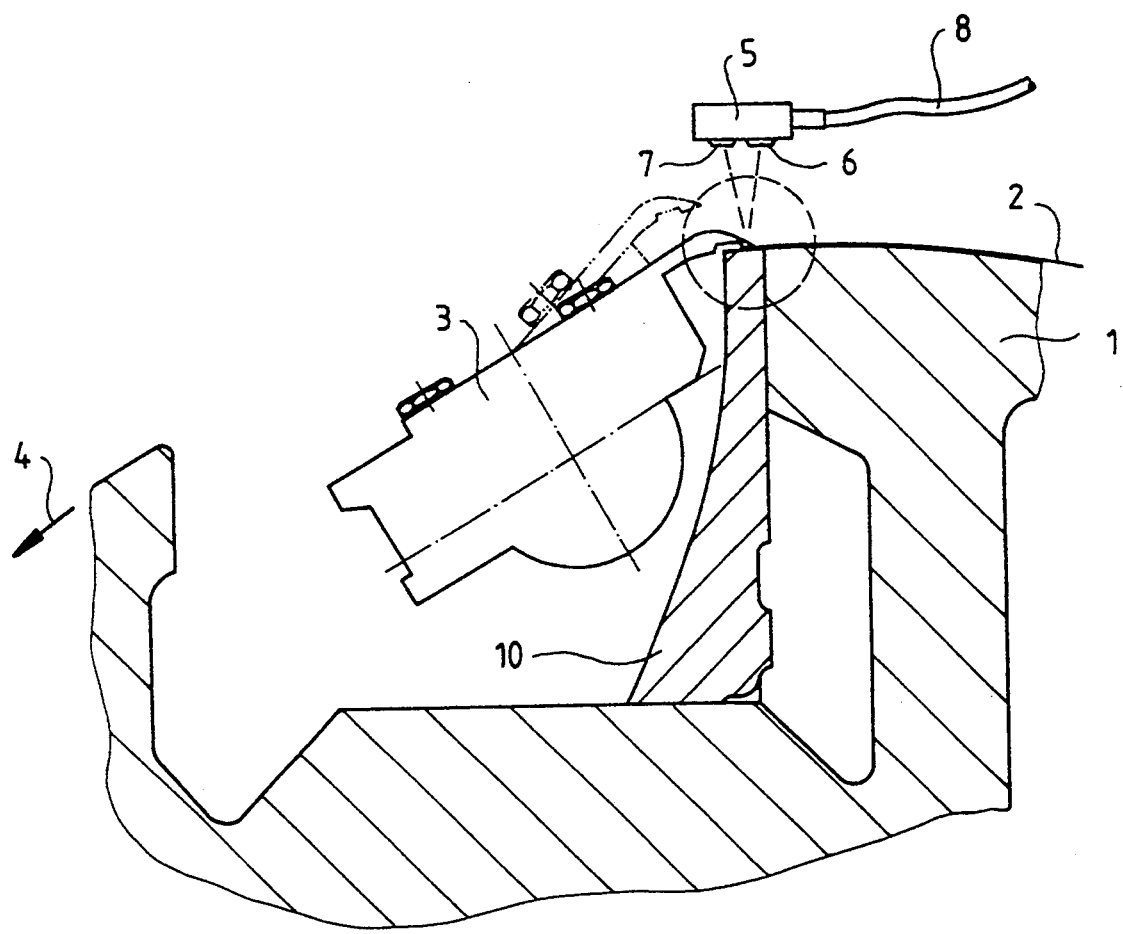
FIG. 1 is a fragmentary cross-sectional view of a cylinder with a gripper system and a photoelectric scanner directed onto the cylinder.

Referring now to the drawing and, first, particularly to FIG. 1 thereof, there is shown therein a cylinder 1, on the surface of which a sheet 2 is held in a gripper system 3. The cylinder 1 is mounted so as to be rotatable in the direction of the arrow 4. Outside the cylinder 1, there is disposed a photoelectric scanner 5 which is fixed to a non-illustrated stationary frame supporting the cylinder 1. The scanner 5 includes a light transmitter 6 and a plurality of photoelectric receiver elements 7, only one of which is shown, which communicate via a cable 8 with a circuit arrangement, namely the circuit arrangement 24 in FIG. 5, for processing measurement signals.

Figure 2:
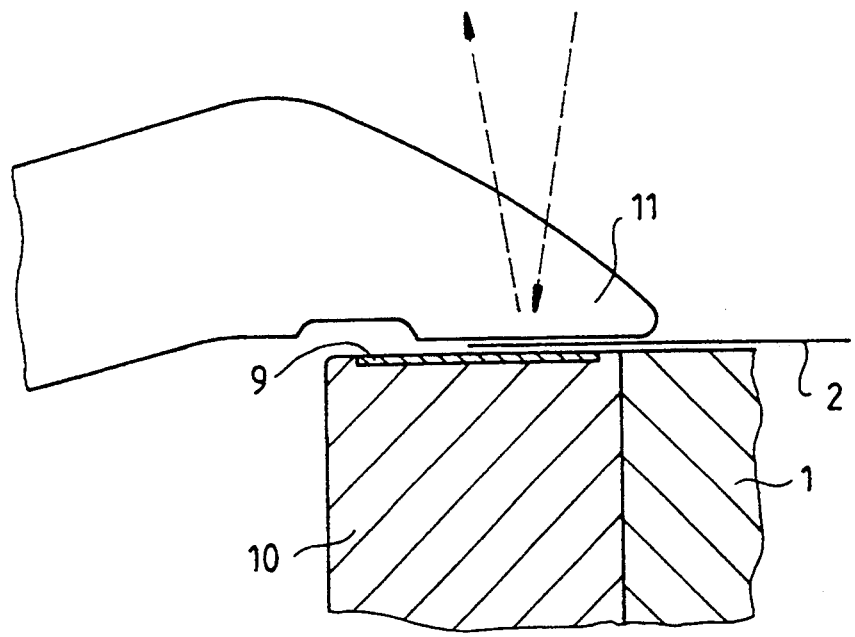
FIG. 2 is an enlarged fragmentary view of FIG. 1 showing the region encircled therein containing an embedded label.

In the enlarged view of FIG. 2, a label 9 is shown embedded in a gripper pad bar or rail 10. The sheet 2 is pressed against the gripper pads of the bar 10 by a tip 11 of a movable gripper member.

Figure 3:
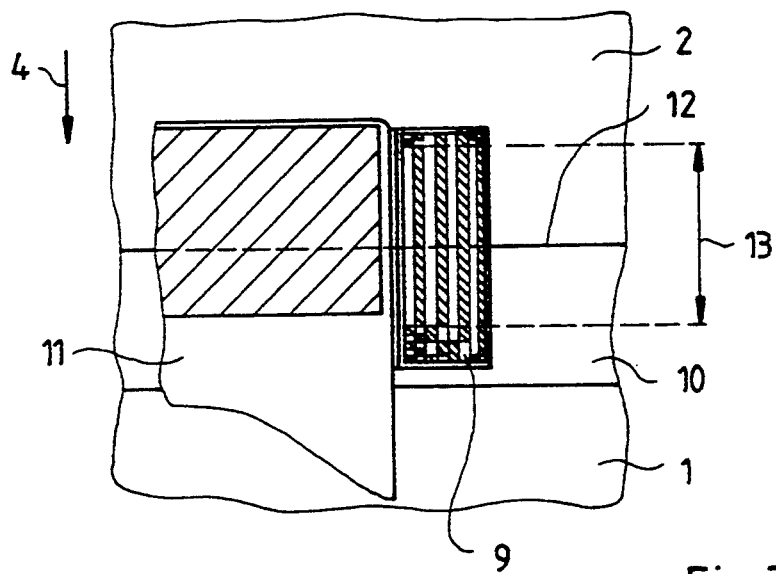
FIG. 3 is a top plan view of FIG. 2 clearly showing the embedded label, the view of FIG. 3 being rotated counterclockwise through an angle of 90° from that of FIG. 1.

In the top plan view of FIG. 3, the positional association of the label 9 with respect to the gripper tip 11 can be readily seen. In accordance therewith, the label 9 lies laterally adjacent to the gripper tip 11. An edge 12 of the sheet 2, the position or location of which on the cylinder 1 is to be determined in accordance with the invention, is disposed within a measuring range 13 of the measuring device of the invention, and the sheet 2 covers part of the label 9.

Figure 4:
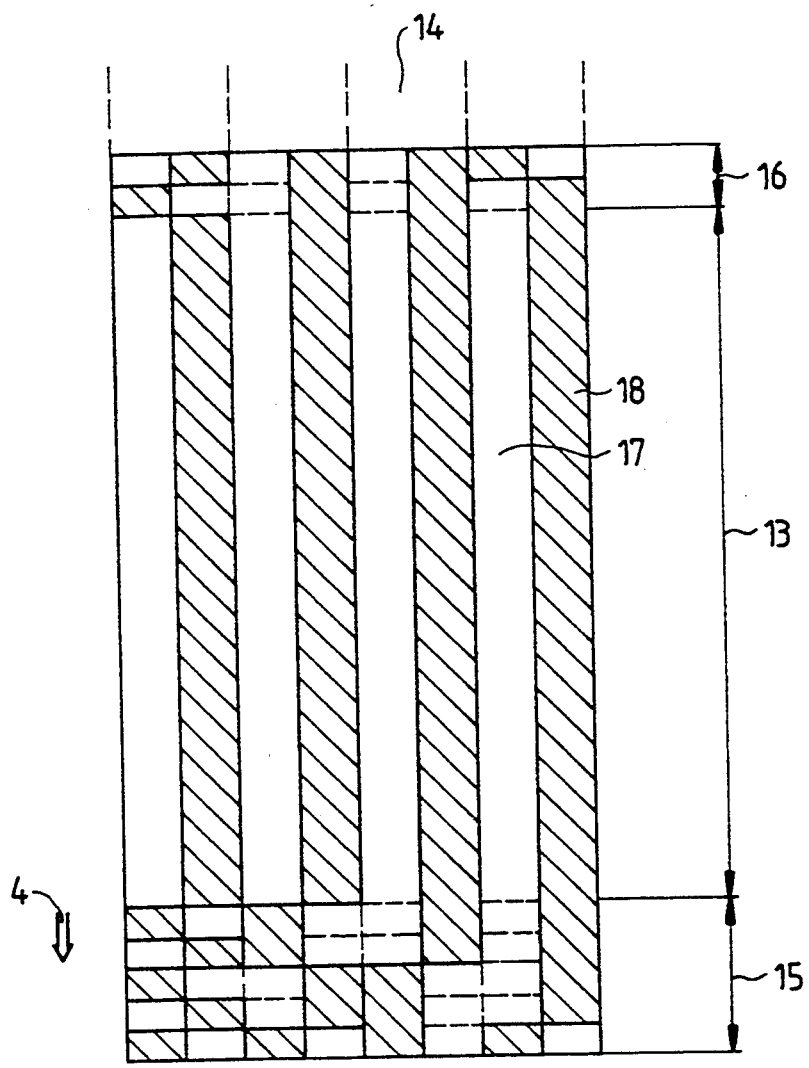
FIG. 4 is an enlarged fragmentary view of FIG. 3 showing the label configuration in greater detail.

In the enlarged view of the label 9 in FIG. 4, there are four mutually adjacent double tracks 14. Each double track 14 is divided into a region having a leading control mark 15, a measuring region 13, and a further region having a trailing control mark 16. Within the measuring region 13, each double track is formed of one track 17 having a high degree of reflection or high reflectivity, and one track 18 having a low degree of reflection or low reflectivity. The control marks 15 and 16, in a raster transverse to the direction represented by the arrow 4, form bit patterns which are detected by the photoelectric scanner 5 shown in FIG. 1.

Figure 5:
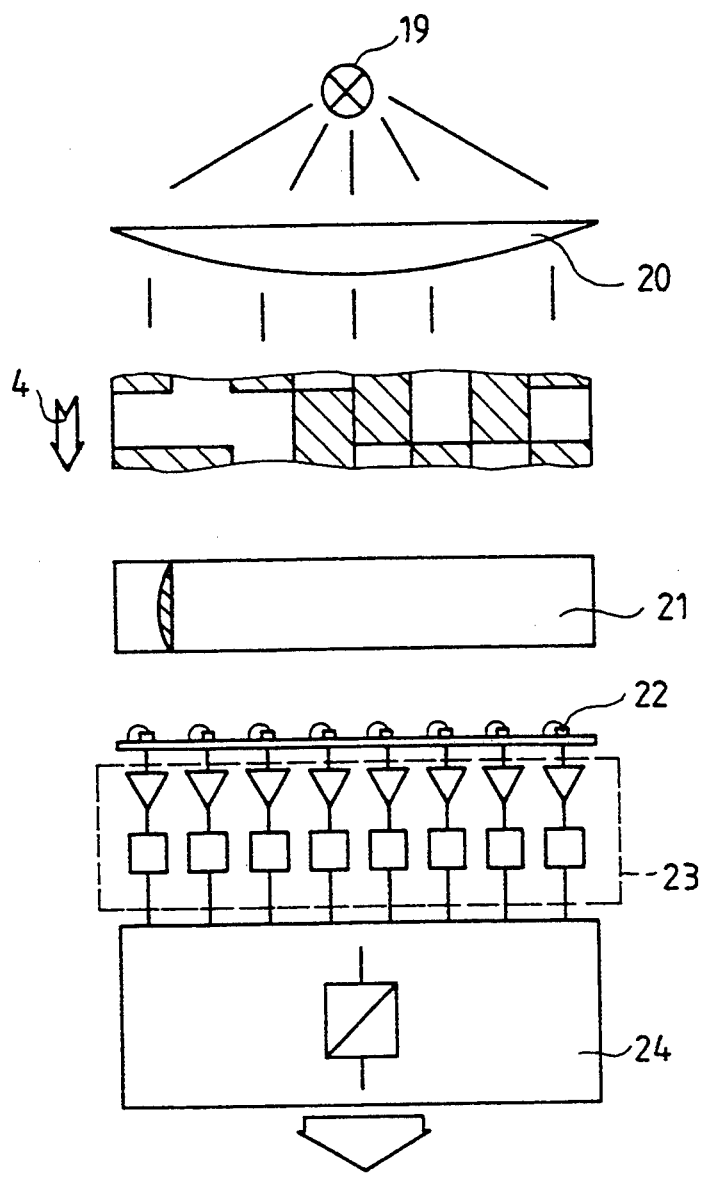
FIG. 5 is a schematic diagram depicting the processing of optoelectronic signals in accordance with the invention.

The manner of operation of the device according to the invention is described hereinafter in conjunction with the diagram of FIG. 5. Light originating from a light source 19 is transmitted, with the aid of illuminating optics 20, onto the surface of the cylinder 1 in a region thereof carrying the label 9. The light reflected from the region in which the label 9 is located is projected onto photoelectric receiver elements 22 by receiving optics 21 constructed as a cylinder lens. Each receiver element 22 receives light from precisely one track 17, 18 of the label 9. Photoelectric currents of the receiver elements 22 are amplified and digitized in a signal preparation or make-ready circuit 23 and, thereafter, processed further in a signal evaluation circuit 24 having an output at which a measurement signal for the position or location of the sheet 2 on the cylinder 1 is obtained. The measurement signal can be used for a numerical measured-value output or as an actual value within a position regulating or control system. Positioning members for front lay stops can serve as adjusting members for correcting the position of the sheet 2 and the succeeding sheet, respectively, the respective sheet 2 being received from the front lay stops by and on the cylinder 1, or by positioning members revolving with the cylinder 1, which effect a relative displacement of the sheet 2 on the cylinder 1 in the direction of the arrow 4.

The receiver elements 22, the signal preparation circuit 23 and the signal evaluation circuit 24 may be integrated in the form of an opto-ASIC, i.e., an opto-advanced standard integrated collector.

From the receiver elements 22, the light signals from the leading control mark 15 are received first. Due to the movement of the label 9 perpendicularly to the scanning line of the receiver elements 22, a control sequence corresponding to the bit pattern is created, from which switching signals for the signal evaluation circuit 24 are derived. Not only initializing and reset signals but also start/stop signals for counter circuits, which are components of the signal evaluation circuit 24, can be derived. Especially when the distance between one bit pattern and the next bit pattern in one track has a defined value, a calibrating signal for the ensuing position or location measurement of the sheet edge 12 can be derived from counting pulses which arrive at the counter circuits between the start signal and the stop signal, these counter pulses being obtained from a fixed-frequency generator. The position or location measuring per se is initiated after the leading control mark 15 has moved past the last control sequence. The pulses that from then on arrive from the frequency generator to the counter circuit until the sheet edge 12 is reached are counted. The number of pulses is proportional to the distance between the sheet edge 12 and the beginning of the measuring region 13. Due to the high frequency and frequency stability of the counting pulses, the resolution and accuracy are correspondingly high.

If no sheet 2, or an overly short sheet 2 or a sheet 2 which has been damaged in the region of the label 9, is being transported on the surface of the cylinder 1, so that the label 9 is not covered by the sheet 2, then, with the aid of the trailing control mark 16, an alarm signal can be issued in the signal evaluation circuit 24, as a result of which further feeding of sheets 2 to the cylinder 1 is stopped.

In the case wherein a plurality of scanners 5 and a plurality of labels 9 are provided over the width of the sheet 2, a skewed position of the sheet 2 or a twisting or bending of the sheet edge 12 on the cylinder 1 can be determined by evaluating the signals, via a simple comparison or formation of the difference between the measurement signals.

Figure 6:
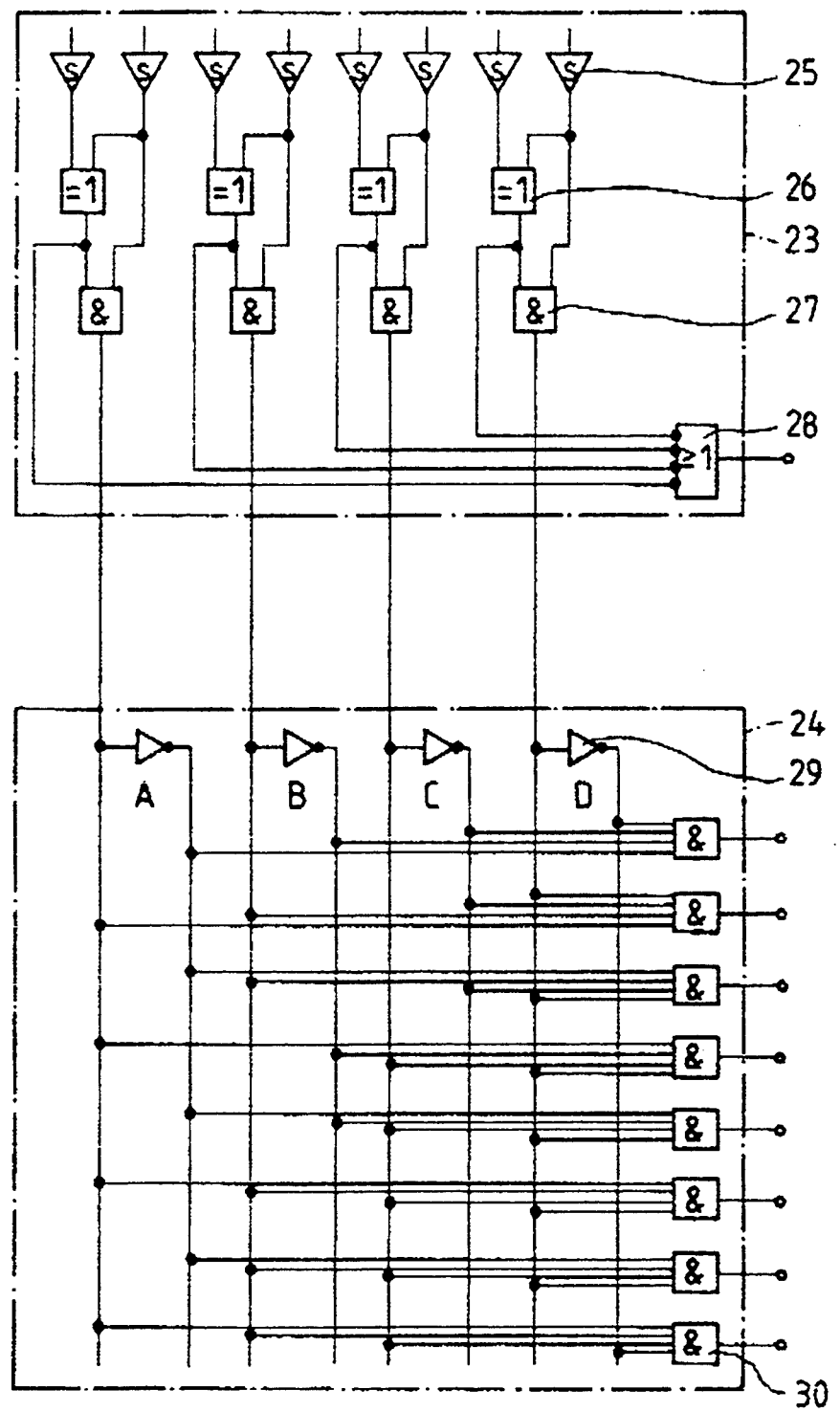
FIG. 6 is an enlarged fragmentary view of FIG. 5 showing in a detailed diagram a signal preparation or make-ready circuit and a signal evaluation circuit according to the invention.

In the circuit diagram of FIG. 6, the signal preparation or make-ready circuit 23 and the signal evaluation circuit 24 of the invention are shown in detail. The signal preparation circuit 23 amplifies and decouples the signals of the optical receiver 22. Furthermore, the signal preparation circuit 23 monitors the non-equivalence of a respective receiver pair. Amplifiers 25 and logic elements 26, 27 and 28 are connected in the circuit 23. At like logical levels, a signal is produced at the output of the logic element 28 if a sheet 2 is present and the light transmitter 6 and the receiver elements 7 and 22, respectively, are soiled.

The output signals of the logic elements 27 are prepared or made-ready by driver elements 29 and further logic elements 30 into control signals for a non-illustrated counter circuit, computer circuit and signal logic circuit.

Further details regarding the circuit of FIG. 6 would exceed the actual scope of the invention. The gist of the invention lies in the novel construction of the label 9 containing the scanning tracks 17 and 18 with which a respective photoelectric receiver element 22 is associated. The specific manner of evaluating the signals of the receiver elements 22 does not constitute an essential feature of the invention.

I claim:

1. Device for measuring a position of a sheet edge on an outer cylindrical surface of a rotating cylinder, having at least one photoelectric scanner operating in accordance with the reflection principle, the photoelectric scanner being fixed to a location outside the cylinder and being connected to a control device for positioning a sheet, as well as being directed towards a sheet edge lying along a line formed on an outer cylindrical surface of the cylinder, and towards a label permanently formed in the outer cylindrical surface of the cylinder, the photoelectric scanner comprising a plurality of photoelectric receiver elements, and the label comprising a plurality of scanning tracks extending in a direction of movement of the sheet edge, each of said scanning tracks being associated with a respective one of said plurality of photoelectric receiver elements inside said photoelectric scanner, the label being covered by the sheet in a given measurement region, and each of said scanning tracks including a leading and a trailing control mark, respectively, having different degrees of reflectivity, the line formed on the outer cylindrical surface of the cylinder being located between said leading and said trailing control marks, and each of said scanning tracks, respectively, having a uniform degree of reflectivity in said given measurement region wherein the label is covered by the sheet.

2. Measuring device according to claim 1, wherein mutually adjacent scanning tracks in said given measuring region have different degrees of reflectivity.

3. Measuring device according to claim 1, including reference labels in said leading control mark of at least one of said scanning tracks.

4. Measurement device according to claim 1, including a logic circuit having outputs, said photoelectric receiver elements being connected to said logic circuit, and a counter circuit having a start/stop input connected to said outputs of said logic circuit.

* * * * *